HIGH-RESISTIVITY LIQUID RESISTANCE
Filed Jan. 3, 1968

United States Patent Office 3,539,470
Patented Nov. 10, 1970

3,539,470
HIGH-RESISTIVITY LIQUID RESISTANCE
Pierre Icre, Versailles, France, assignor to Commissariat
a l'Energie Atomique, Paris, France
Filed Jan. 3, 1968, Ser. No. 695,516
Claims priority, application France, Jan. 13, 1967,
91,159
Int. Cl. H01c 11/00
U.S. Cl. 252—500                                             1 Claim

---

ABSTRACT OF THE DISCLOSURE

A liquid resistance which has high resistivity, is stable in time and essentially consists of a non-polar solvent to which an organic acid is added in order to enhance the ionizing properties of the solvent and a base for neutralizing the acid.

The organic acid is a carboxylic acid such as trichloroacetic acid, succinic acid and picric acid. The non-polar solvent is, for example, carbon tetrachloride, benzene and dioxane. The base is of the aminated type such as, for example, diethylamine.

The concentration of the acid in the solvent is within the range of 2 M to $10^{-2}$ M.

---

The present invention is directed to a liquid resistance which has high resistivity and which is stable in time.

Very high values of resistance are required in the operation of particle accelerators in order to distribute the potential between the high-voltage electrode and ground. In point of fact, solid resistances which are capable of withstanding high voltages and which also exhibit good stability cannot readily be found commercially. It can be stated by way of example that the agglomerated-carbon resistances which are mounted on the Van de Graaf accelerator of the "Saturne" proton synchrotron at the French nuclear research center of Saclay have values of resistance which vary by 50% in the course of one year.

While many researches have been devoted to liquids both as insulating agents and as dielectrics, the possibility of employing them as a high value of resistance has not been contemplated up to the present time.

It is nevertheless worthy of note that some attention has been given to the use of plain water as a liquid resistance. The principle of this resistance is as follows: the water flows within a metallic pipe and is thus charged with $Cu^{+++}$ ions, $Fe^{+++}$ ions, $CO_3^{--}$ ions, $OH^-$ ions. The conductivity of the water therefore increases by variation of the ionic force. The water is purified by being passed through anionic and cationic resins and its initial resistivity is theoretically restored.

However, this liquid resistance had a low resistivity which was less than $10^7$ Ω/cm. Moreover, the voltages which were applied to this resistance were of a low order, thereby reducing the dangers of breakdown and polarization phenomena.

The present invention has for its object a liquid resistance having a resistivity which is comprised between $10^7$ and $10^{11}$ Ω/cm. and which have good stability in time.

A liquid resistance has certain advantages over a solid resistance and these can be summarized as follows:

Natural stability of the resistivity of the liquid or of the mixture of liquids selected,
Ease of periodic renewal of said liquid in the case in which the resistivity varies in time.
Possibility of regulation of the liquid resistance within a given range of resistivity,
Easy choice of resistivity in the case of a mixture of liquids of predetermined nature by variation of the composition,
Easier removal of heat.

The present applicant has studied the possibility of making use of solvents as a base of the liquid resistance. The solvents can be classed as:

(1) non-polar solvents such as benzene, carbon tetrachloride, dioxane, the resistivity of which is higher than or at least equal to $10^{13}$ Ω/cm. and which have a low dielectric constant ($\epsilon \leq 10$).

(2) polar solvents such as glycol, glycerol, acetonitrile, the resistivity of which is low ($\rho \leq 10^6$ Ω/cm. and which have a high dielectric constant ($\epsilon \geq 20$).

Taking into account their low dielectric constant, the solvents of class (1) cited above have no ionizing property whereas the solvents of class (2) readily ionize certain organic or mineral salts. This is the case of water which is the standard type of polar solvent.

The present application is based on the observation that the increase in the concentration of mineral or organic salt in a non-polar medium results in an increase in the ionizing properties of said non-polar solvent.

The liquid resistance in accordance with the invention is essentially constituted by a non-polar solvent to which is added an organic acid in order to enhance the ionic properties of said solvent and a base for neutralizing the acid.

Any non-polar solvent should serve to form the liquid resistance. It is merely necessary for this purpose to ensure that, on the one hand, the organic acid chosen is soluble in said solvent and that, on the other hand, the organic salt which is formed after addition of the base is also sufficiently soluble in the medium.

The organic acid which must be soluble in the solvent chosen is crystallized, anhydrous and preferably of high purity. The base must form with the neutralized acid a salt which is soluble in the base solvent.

The liquid resistances thus obtained make it possible to attain all the values of resistivity within the range of $10^7$–$10^{11}$ Ω/cm. The value of resistivity is a function of the initial concentration of organic acid and of the ratio of non-neutralized acid to salt formed and therefore of the quantity of base added.

Referring to the accompanying diagrammatic FIGS. 1 and 2, there will be described hereinafter one non-limitative example of a high-resistivity liquid resistance in accordance with the invention. The practical arrangements which will be described in connection with these examples must be considered as forming part of the invention, it being understood that any equivalent arrangements could equally well be employed without thereby departing from the scope of the invention.

Figure 1:
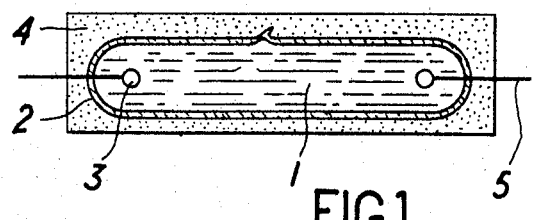
FIG. 1 shows a liquid resistance in accordance with the invention.

The liquid resistance which is shown in FIG. 1 is constituted by a resistance liquid 1 contained in a sealed glass ampoule 2 (having an internal diameter of 10 mm., an external diameter of 14 mm. and a length of 30 mm.). Two platinum electrodes 3 (spheres 3 mm. in diameter) which are connected to platinum contacts 5 are placed in said liquid. The complete assembly is encased in an insulating material 4.

Figure 2:
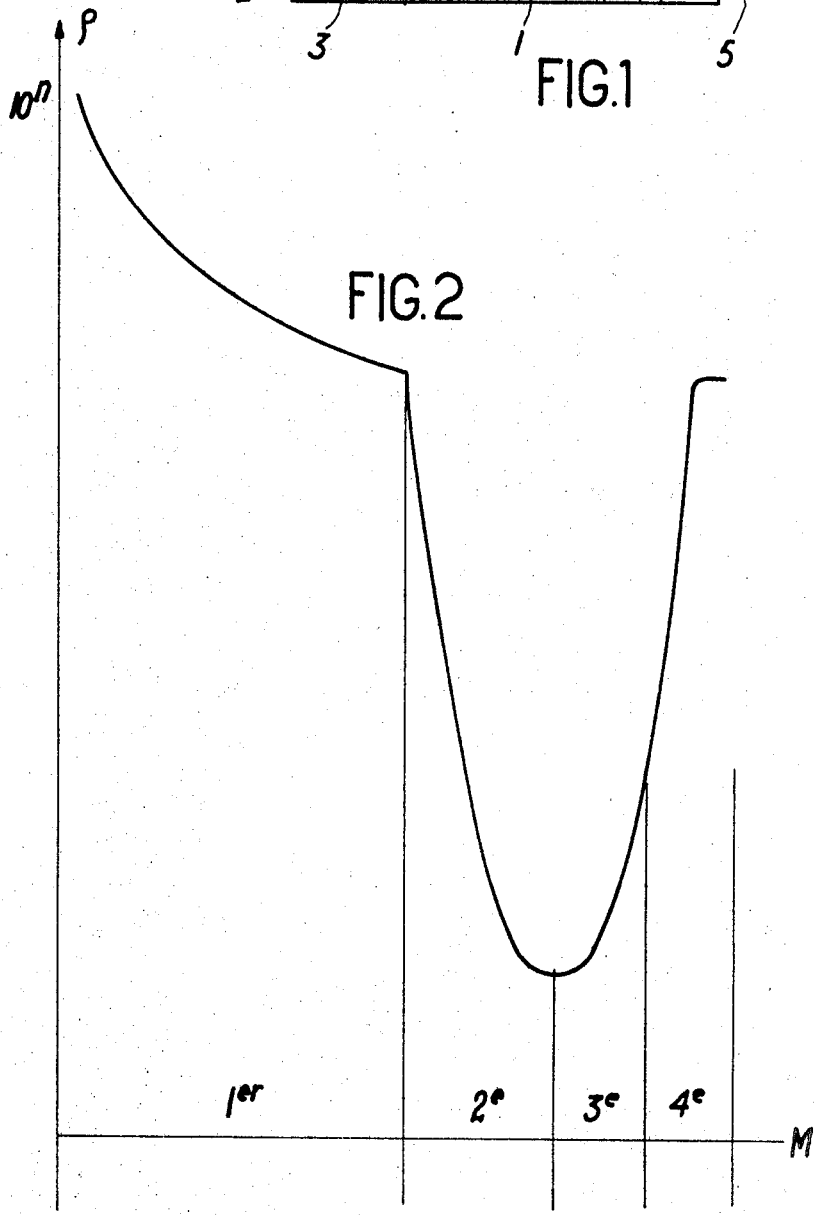
FIG. 2 is a presentation of the curve of acid-base neutralization in a non-polar medium.

In FIG. 2, there is shown the general shape of the curves of neutralization in semi-logarithmic coordinates of an organic acid by an organic base in a non-polar medium. The quantities of acid and base M which are added to the solvent have been plotted as abscissae and the resistivity $10^n$ has been plotted as ordinates.

The shape of these curves can be explained as follows. In a first stage ($1^{er}$) the dissolution of the acid in the non-polar solvent does not produce any appreciable reaction of the conductivity. The dielectric constant of the non-polar solvent is in fact small and eliminates any possibility of dissociation of the acid and therefore of increased conductivity.

However, there is observed a small reduction in resistivity of the solvent by reason of the presence of water in the crystallized acid. This presence of water results in a slight variation in the dielectric constant of the medium and therefore in dissociation of the acid.

In a second stage ($2^e$) which corresponds to the addition of the base, the conductivity rises at a fast rate. This abrupt fall in resistivity can be attributed to the dissociation of the acid which is due to the increase in salt concentration of the medium.

This assumption has been confirmed by observation of the fact that the direct dissolution of the salt derived from this neutralization does not result in any appreciable variation of the conductivity: the current is therefore effectively transported by means of the ions derived from the dissociation of the acid.

It is observed in this connection that the dissolution of a mineral salt of copper in a non-polar solvent such as dioxane does not increase the conductivity of said solvent; on the other hand, if this dissolution is carried out in an acid solution in dioxane, the resistivity falls rapidly.

The salt which is formed or dissolved is not dissociated and therefore does not play a part in transporting current, its function being to assist only the dissociation of the acid.

At the end of the second stage, the slope of the curve of variation of resistivity as a function of the addition of base levels off and this curve accordingly presents a minimum. In fact, if the coefficient of dissociation of the acid increases with the concentration of salt formed, the total concentration of acid decreases since it is neutralized. Two contrary effects are therefore exhibited: on the one hand, there is an increase in the number of ion formed as a result of an increase in the dissociation constant; on the other hand, there is a decrease in the number of ions formed as a result of a decrease in the total concentration of acid. These two opposite effects tend to reduce the variation of conductivity to zero.

In a third stage ($3^e$) the phenomenon of neutralization becomes predominant and the conductivity decreases.

Finally, in a fourth stage ($4^e$) corresponding to total neutralization, the solution contains an undissociated salt and an excess of undissociated base, the conductivity stabilizes at a low value which is close to that of the initial solution of acid in the solvent.

A high-resistivity liquid resistance having good stability is constituted, for example, by a solution of trichloroacetic acid in carbon tetrachloride neutralized by diethylamine.

The concentration of the acid in the solvent is comprised between 2 M and $10^{-2}$ M according to the resistivity which is sought. The base is added in a quantity such that the ratio of concentrations of non-neutralized acid to salt formed is preferably comprised between 0.7 and 1.3.

By way of non-limitative example, the following mixtures have been prepared:

$$\frac{\text{Acid}}{\text{Salt}} = \frac{1.3 \times 10^{-2} \text{ mole}}{0.7 \text{ mole}} \quad \rho = 1.6 \times 10^9 \ \Omega/\text{cm}. \quad (1)$$

$$\frac{\text{Acid}}{\text{Salt}} = \frac{1 \times 10^{-2} \text{ mole}}{1 \times 10^{-2} \text{ mole}} \quad \rho = 8 \times 10^8 \ \Omega/\text{cm}. \quad (2)$$

$$\frac{\text{Acid}}{\text{Salt}} = \frac{0.8 \times 10^{-2} \text{ mole}}{1.2 \times 10^{-2} \text{ mole}} \quad \rho = 5.4 \times 10^8 \ \Omega/\text{cm}. \quad (3)$$

$$\frac{\text{Acid}}{\text{Salt}} = \frac{0.6 \times 10^{-2} \text{ mole}}{1.4 \times 10^{-2} \text{ mole}} \quad \rho = 4 \times 10^8 \ \Omega/\text{cm}. \quad (4)$$

The initial concentration of acid was in the vicinity of $1.6 \times 10^{-1}$ M.

The liquid resistance (4), that is to say $\rho = 4 \times 10^8 \ \Omega/\text{cm}$. has been employed in a high-voltage circuit having the following essential characteristics:

Total voltage: 100,000 v.
Number of electrodes: 7
Voltage between each electrode: 30,000 to 35,000 v. (the voltage of +100,000 v. was developed at the center of 3 electrodes).
Electric field of the order of 10,000 v./cm.
Electrodes of stainless steel
Distance between electrodes: 3 cms.

A single resistance was employed under the following conditions:

Voltage of 750,000 v. distributed between the high-voltage electrode and ground by a series of 14 and 15 electrodes,
Voltage between each electrode: 50 to 55,000 v.
Electric field of the order of 15–20,000 v./cm.
Electrodes of platinum or of stainless steel
Distance between electrodes: 2 to 3 cms.

The liquid resistance exhibited only a very slight variation: initial resistivity $2.29 \times 10^8 \ \Omega/\text{cm}$.; resistivity after 100 hours $2.30 \times 10^8 \ \Omega/\text{cm}$.

Furthermore, said liquid resistance withstands electric fields of 300 kv./cm. without breakdown.

Other liquid resistances having high resistivity and good stability can be obtained by neutralization of solutions of oxalic, succinic and picric acids in a non-polar solvent such as benzene or dioxane.

What we claim is:

1. A high-resistivity liquid resistance which is stable in time comprising a non-polar solvent to which an organic acid is added to enhance the ionizing properties of the solvent and a base of neutralizing the acid, the organic acid being selected from the group consisting of trichloroacetic acid, succinic acid and picric acid, the non-polar solvent being selected from the group consisting of carbon tetrachloride, benzene and dioxane, and the base being diethylamine, the concentration of acid in the solvent being between 2 M and $10^{-2}$ M, and the base being in proportion such that the ratio of concentration of non-neutralized acid to salt formed is between 0.7 and 1.3.

References Cited

UNITED STATES PATENTS

| | | | |
|---|---|---|---|
| 2,261,974 | 11/1941 | Craig | 338—27 |
| 2,387,313 | 10/1945 | Wilson | 338—44 X |
| 2,617,770 | 11/1952 | Hardy et al. | 252—63.7 |
| 2,737,810 | 3/1956 | De Witte | 338—222 X |
| 2,840,627 | 6/1958 | Lewis | 252—66 X |

OTHER REFERENCES

Ind. & Eng. Chemistry, vol. 29, June 1937, pp. 698–702, an article by F. M. Clark.

REUBEN EPSTEIN, Primary Examiner

U.S. Cl. X.R.

338—222, 44, 38, 80; 252—63, 65